No. 898,143. PATENTED SEPT. 8, 1908.
O. SCHMITT.
LUNCH BOX.
APPLICATION FILED JUNE 8, 1906.
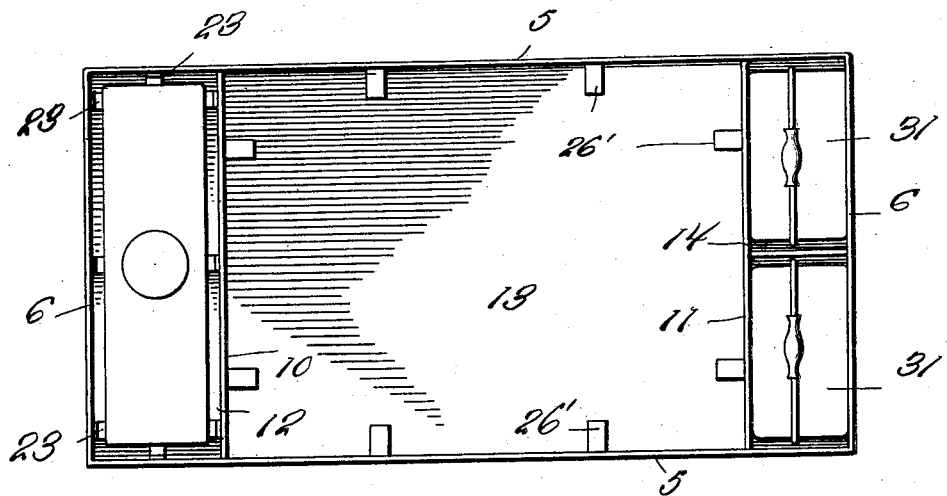
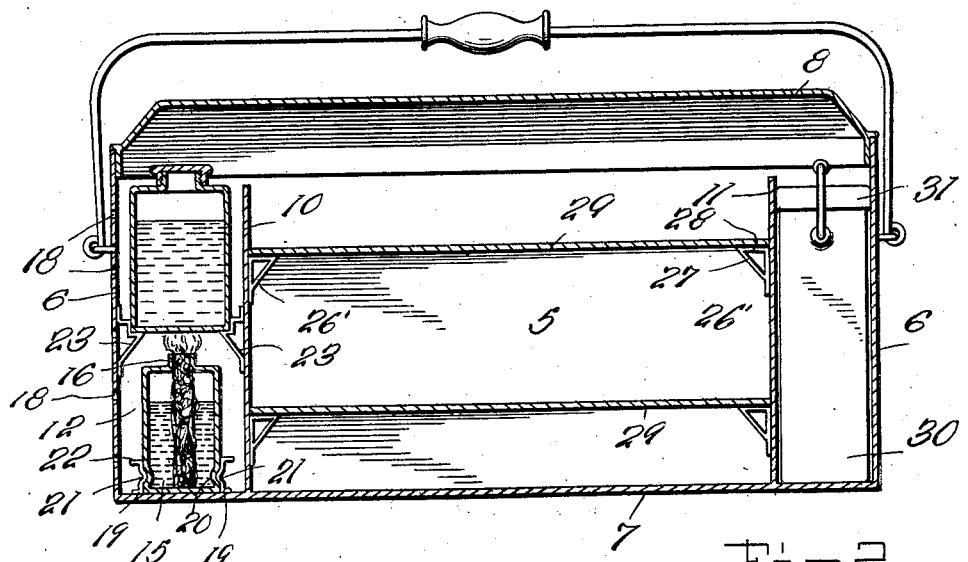
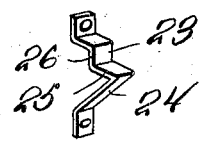
Witnesses
C. R. Thomas
F. B. MacNab.
Inventor
O. Schmitt
By Chandler & Chandler
Attorneys

UNITED STATES PATENT OFFICE.

OSCAR SCHMITT, OF DAVENPORT, WASHINGTON.

LUNCH-BOX.

No. 898,143.　　　　　Specification of Letters Patent.　　　　　Patented Sept. 8, 1908.

Application filed June 8, 1906. Serial No. 320,902.

*To all whom it may concern:*

Be it known that I, OSCAR SCHMITT, a citizen of the United States, residing at Davenport, in the county of Lincoln, State of Washington, have invented certain new and useful Improvements in Lunch-Boxes; and I do hereby declare the following to be a full, clear, and exact description of the invention, such as will enable others skilled in the art to which it appertains to make and use the same.

This invention relates to lunch buckets and has for its object to provide a device of this nature which will be extremely simple in construction, and which will include a coffee container located directly above a suitable burner or lamp, means being provided whereby the coffee receptacle will be held in spaced relation to the sides of the compartment in which it is located to permit a free supply of air to the lamp heater.

With the above and other objects in view, the invention consists in the novel construction and arrangement of parts hereinafter fully described, shown in the accompanying drawings and particularly pointed out in the appended claims, it being understood that various changes in the form, proportion, size and minor details may be made within the scope of the claims, without departing from the spirit and sacrificing any of the advantages of the invention.

In the drawings:—Figure 1 is a top plan view of the device with the cover removed, part being broken away. Fig. 2 is a vertical longitudinal sectional view through the same. Fig. 3 is a detail perspective view of a portion of one of the walls of the compartment for the coffee receptacle showing the means for supporting the same.

Referring more specifically to the drawings, the bucket proper comprises sides 5 and ends 6, a bottom 7 and a removable cover 8, and is adapted to be carried by means of a handle of any desired construction.

The bucket is divided by means of partitions 10 and 11 into compartments 12, 13 and 14, which are designed for purposes to be hereinafter described. Removably located within the compartment 12, is a lamp stove 15, including a burner 16 and formed in the adjacent end 6 is a series of openings 18 for supplying air to said lamp stove. The lamp stove 15 is held securely in position within the compartment 12 by means of spring clip fingers 19, which are secured at their lower ends to the bottom 7 of the bucket, there being a pair of such fingers disposed to engage the sides of the lamp stove adjacent each of its ends and a finger disposed to engage each end of the same.

The lamp stove 15 is preferably provided in its sides and ends adjacent its bottom with a continuous groove 20 and each of the spring fingers 19 is crimped above its point of connection with the bottom 7 of the bucket as at 21, the said crimped portions of the fingers being designed for engagement in the grooves 20 to hold the lamp stove against the displacement. The extreme upper end of each finger is bent outwardly as at 22 to permit ready placing of the lamp stove in its proper position. A container for coffee or other drinks is also removably located within the compartment 12 and above the lamp stove 15 and is supported in this position by means of brackets 23. The brackets 23 are preferably formed of strips of sheet metal and are secured at their upper and lower ends to the walls of the said compartment. Each strip is inclined from its lower end, upwardly and outwardly from the respective wall as at 24, and is thence bent inwardly in a horizontal plane as at 25 and upwardly as at 26 to form a shoulder against which the sides and ends of the said container lie, it being understood that the container is thus held in spaced relation to the walls of the compartment, and that it rests upon the portion 25 of the strips.

The compartment 13 is located intermediate the compartment 12 and the compartment 14 and upon the walls of the said compartment are secured brackets 26', which as in the case of the brackets 23 are formed of strips of metal and include each an inclined portion 27 and a horizontally extending portion 28, which latter serves as a rest for trays 29, there being, as will be readily understood, a series of brackets for each tray, the said trays being designed to support pies or the like.

Located removably within the compartment 14 is a pair of cans 30 which include each a top 31 and which may be used as containers for various food stuffs.

What is claimed, is:—

A device of the class described comprising an oblong body, a top for the body, a vertical partition located within the body adjacent each end thereof and extending from side to side of the same, the said partitions forming in conjunction with the ends of the body end compartments and between themselves an intermediate compartment, brackets upon the partitions and the sides of the body, shelves removably supported within the intermediate compartment and upon said brackets, a partition subdividing one of said compartments, food containers removably disposed within said subcompartments, a liquid container supported within the other end compartment and above the bottom thereof, and a heater disposed beneath said liquid container.

In testimony whereof, I affix my signature, in presence of two witnesses.

OSCAR SCHMITT.

Witnesses:
  Mrs. M. SCHMITT,
  CLARA L. ARCHER.